INVENTOR
WESLEY L. PEARL
BY John R. Duncan
ATTORNEY

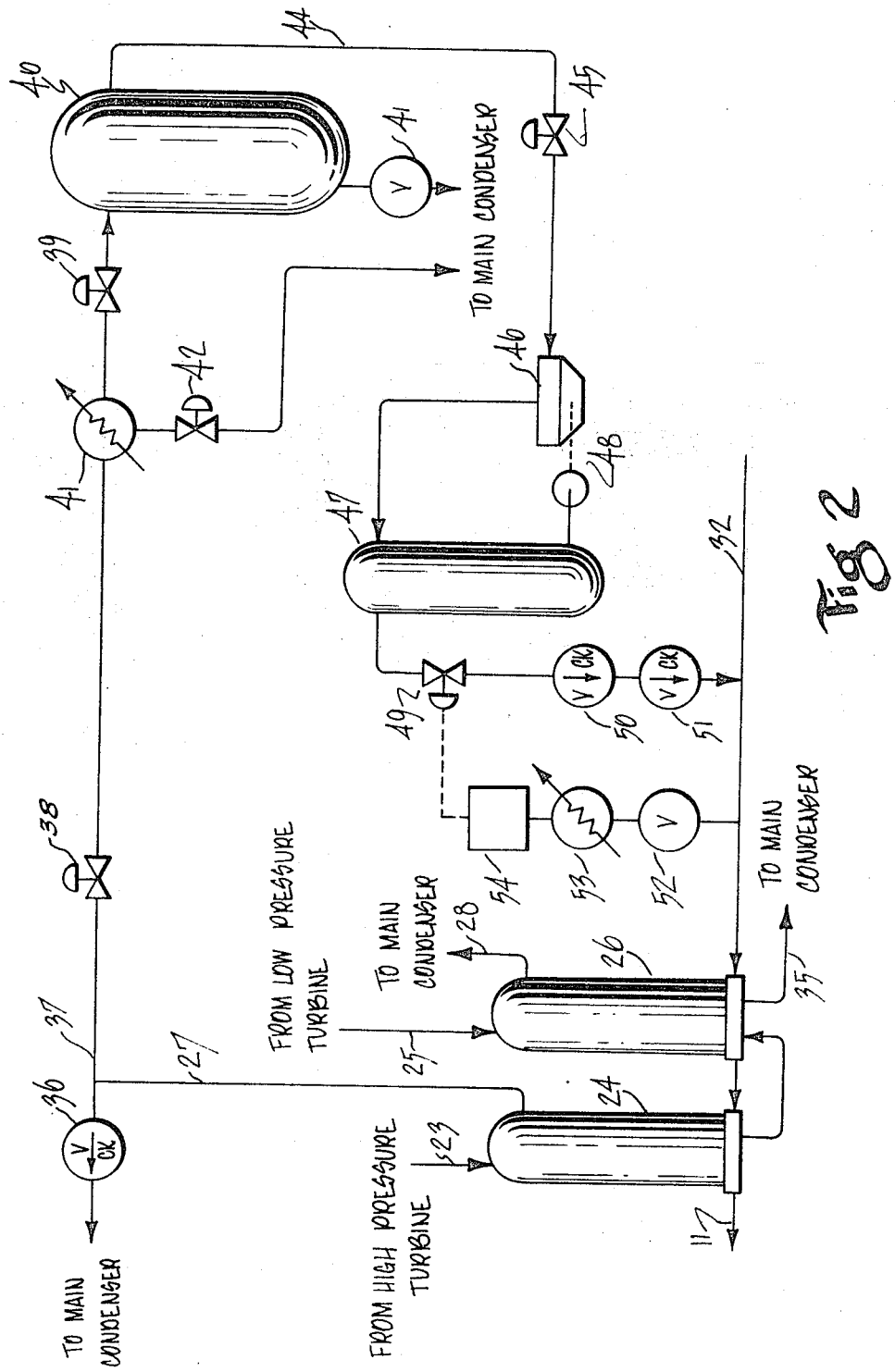

3,663,725
CORROSION INHIBITION
Wesley L. Pearl, San Jose, Calif., assignor to
General Electric Company
Continuation of application Ser. No. 680,235, Nov. 2,
1967. This application Apr. 23, 1970, Ser. No. 29,736
Int. Cl. G21c 9/00
U.S. Cl. 176—38         4 Claims

ABSTRACT OF THE DISCLOSURE

A small proportion of oxygen and hydrogen, preferably about 100 to 300 parts per billion of oxygen and stoichiometric amount of hydrogen, is introduced into the boiler feedwater in an electrical power generating plant so as to decrease the corrosion rate of materials such as carbon steel in the feedwater heater chain. This technique is especially useful in water cooled or moderated nuclear power plants since a suitable supply of oxygen and hydroen are generated by radiolytic decomposition of water in the reactor core and because corrosion products in the water supply are especially harmful in such a plant.

This application is a continuation of application Ser. No. 680,235, filed Nov. 2, 1967, now abandoned.

DISCLOSURE

This invention relates in general to steam generating sysctems and, more specifically, to the inhibition of corrosion in such systems.

Large modern electrical power plants whether nuclear or fossil fueled, incorporate large steam boilers, operating at high temperatures and pressures. Corrosion has plagued the operation of steam power plants to varying degrees since their inception. Corrosion is detrimental both from the point of view of wear and the eventual replacement requirements of the corroding elements and because corrosion products tend to deposit on heat transfer surfaces, decreasing the efficiency of the plant. The cost of corrosion includes replacement of corroded parts, higher fuel costs due to impaired heat transfer from the heat supplying fuel to the water or steam and in lost revenues during down time while replacing corroded parts.

Electrical power plants using nuclear fission reactions to generate heat to produce steam for electrical generators are now well known. Typical systems include those described in the book "Nuclear Power Plants," D. Van Nastrand Inc., (1964). In one of these systems, steam is generated directly. The reactor consists essentially of an array of fuel elements containing fissionable material in a vessel permitting flow of water past the fuel elements where it is heated and at least partly vaporized by the heat generated by nuclear fission. In this so-called "Boiling Water Reactor," the steam produced is dried, passed to a turbine-generator, condensed, demineralized, preheated, and returned to the reactor.

Corrison is a serious problem in such a system. While many of the problems caused by corrosion are similar to those found in a fossil-fuel power plant, other directly involve the nuclear reactor portion of the plant. The constant slight radioactivity in the water and steam cycled through a nuclear power plant and in corrosion products deposited on the equipment make disassembly and removal of corroded piping or system equipment difficult because of the personnel safety precautions necessary. Even more significant are problems caused by the deposition of corrosion products from system piping and equipment on the fissionable fuel elements. These deposits adversely effect the transfer of heat from the fuel element to the adjacent water stream. The water must pass through the array of fuel elements, often through small openings which could be closed by deposits of corrosion products. The accumulation of such corrosion products on the reactor fuel elements causes gradually increasing temperatures in the fuel. This decreases the life of fuel if fuel elements are overheated. Obviously, it is undesirable to disassemble and clean the fuel element array often, since it requires shutting down the plant and a complex remote handling procedure due to the intense radioactivity of the fuel elements.

Thus, there is a continuing need for improved methods of inhibiting corrosion in steam power plants, especially in those using nuclear energy as the heat source.

SUMMARY OF THE INVENTION

It is, therefore, an object of this invention to provide a method of overcoming the above-described corrosion problems.

It is another object of this invention to prolong the life of steam generation equipment.

It is another object of this invention to improve the lifetime efficiency of nuclear fuel elements.

It is another object of this invention to utilize part of the oxygen and hydrogen radiolytically formed in a nuclear reactor.

It is still another object of this invention to make possible the use of a wider variety of materials in nuclear power plant equipment.

The above objects and others are accomplished in accordance with this invention, fundamentally, by introducing into the boiler feedwater of a steam generating plant from about 50 to about 30,000 parts per billion (p.p.b.) (by weight) of oxygen. It is strongly preferred that in addition to this range of oxygen, that a stoichiometric amount of hydrogen be similarly added. The ratio should be about one part by weight hydrogen for each 8 parts by weight oxygen.

Surprisingly, the addition of these amounts of oxygen and hydrogen decrease the corrosion products lost to the water system by a factor of at least 10 for many materials over the amounts lost to the water system when oxygen contents is held below about 10 p.p.b.

While advantageous results are obtained over the range of about 50 to about 30,000 p.p.b. oxygen in the feedwater, best corrosion inhibition has been obtained with from about 100 to about 300 p.p.b. oxygen and the stoichiometric equivalent of hydrogen in the boiler feedwater. Highly effective corrosion inhibition, with lowest release of corrosion products into the feedwater from piping and other surfaces in contact therewith has been obtained with about 200 p.p.b. oxygen and about 25 p.p.b. hydrogen in the feedwater. The inclusion of a stoichiometric quantity of hydrogen with the oxygen appears to aid in corrosion inhibition. Also, the hydrogen tends to suppress the radiolytic decomposition of water to oxygen and hydrogen in a water cooled or moderated reactor.

The technique of this invention is useful in reducing corrosion of any suitable metal. Best results have been obtained with carbon steels and low-alloy steels. Good results have also been obtained with stainless steels, although the advantages are not so dramatically apparent since the stainless steels are resistant to corrosion even without the presence of the desired quantities of oxygen and hydrogen. Typical steels include those having the following compositions, in weight percent; the balance being iron in each case.

| Steel | C | Mn | P | S | Si | Cu | Ni | Cr | Mo | Others |
|---|---|---|---|---|---|---|---|---|---|---|
| Carbon steels | | | | | | | | | | |
| AISI C 1008 | 0.06 | 0.43 | 0.005 | 0.028 | 0.01 | | | | | |
| ASTM A 212 Grade B | 0.27 | 0.92 | 0.016 | 0.028 | 0.22 | | | | | |
| ASTM A 201 Grade A | 0.20 | 0.55 | 0.015 | 0.029 | 0.24 | | | | | |
| Low-alloy steels | | | | | | | | | | |
| USS TRI-TEN | 0.15 | 0.95 | 0.014 | 0.039 | 0.20 | 0.29 | | | | V=0.09 |
| USS COR-TEN | 0.08 | 0.45 | 0.100 | 0.026 | 0.47 | 0.29 | 0.28 | 0.76 | | |
| Alloy steels | | | | | | | | | | |
| ASTM A 302 Grade B | 0.20 | 1.29 | 0.014 | 0.011 | 0.18 | | | | 0.55 | |
| AISI 4130 | 0.30 | 0.51 | 0.010 | 0.019 | 0.26 | | | 1.05 | 0.20 | |
| AISI 4340 | 0.41 | 0.86 | 0.012 | 0.018 | 0.29 | | 1.75 | 0.77 | 0.25 | |
| Stainless steels | | | | | | | | | | |
| AISI Type 502 | 0.07 | 0.53 | 0.019 | 0.012 | 0.44 | | | 5.00 | 0.54 | |
| AISI Type 410 | 0.10 | 0.35 | 0.016 | 0.017 | 0.28 | | | 12.09 | | |
| AISI Type 304 | 0.06 | 1.60 | 0.040 | 0.016 | 0.58 | | 9.40 | 18.80 | | |

The oxygen or oxygen-hydrogen to be added may be obtained from a variety of sources and introduced into the feedwater in a variety of ways, as is further described below.

DESCRIPTION OF THE DRAWINGS

The present invention will be more readily understood upon reference to the accompanying drawing in which:

FIG. 2 is a schematic flow diagram of a preferred embodiment of the present invention in which a portion of the condensed steam on the shell side of the feedwater heaters is introduced into the feedwater system to maintain the desired oxygen level in the feedwater.

FIG. 1 shows a typical nuclear power plant of the boiling water type. Fundamentally, water is vaporized in the nuclear reactor and passes to a turbine which drives an electrical generator.

Figure 1:
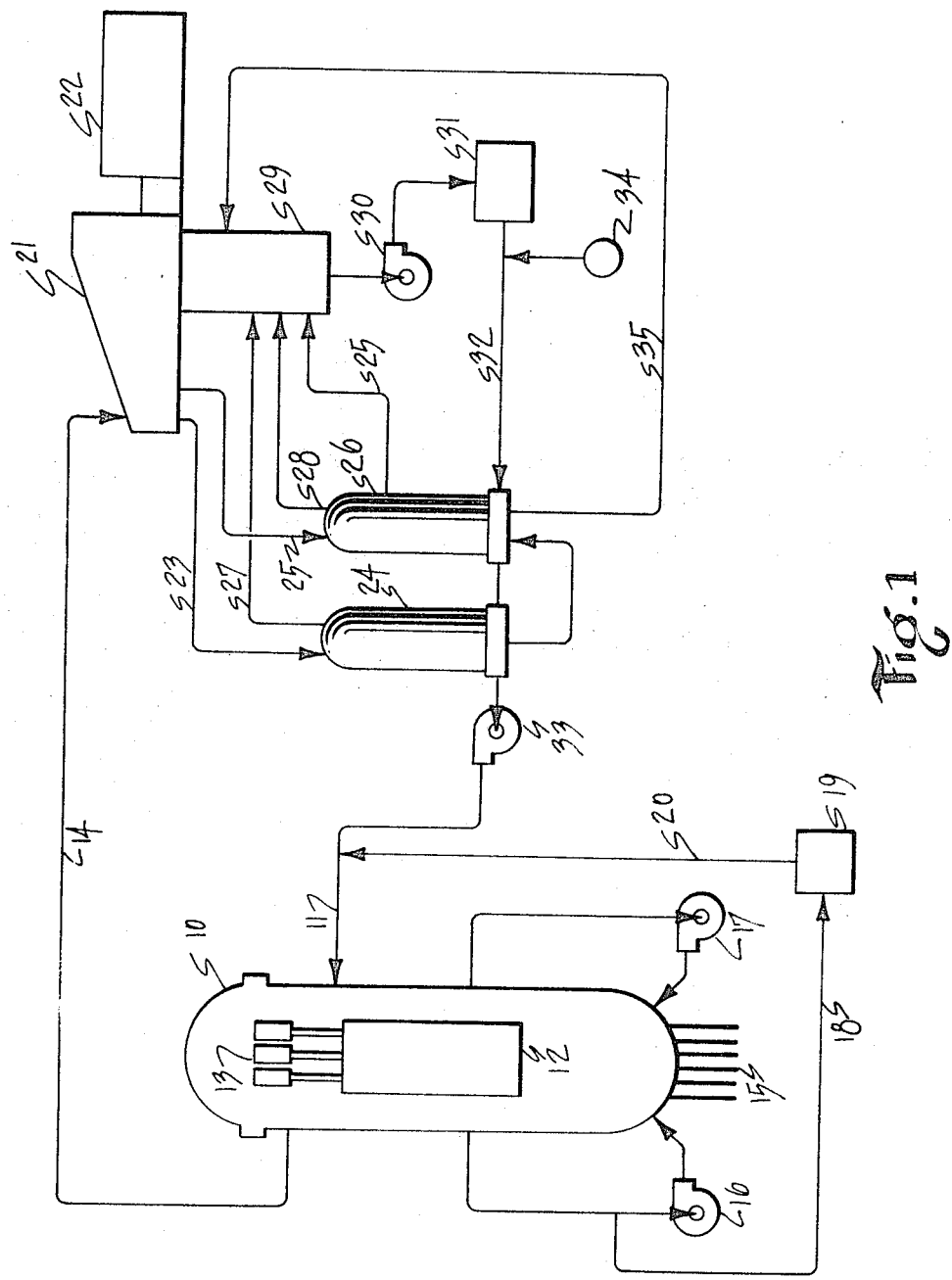
FIG. 1 is a schematic flow diagram of a nuclear power plant of the sort in which the present invention is useful.

After leaving the turbine, the steam is condensed, purified, preheated and returned to the reactor for reuse. It should be noted, as is pointed out above, that while the present invention is especially useful in a system such as that shown in FIG. 1, it also has utility in other steam generating systems, both nuclear and fossil-fueled.

As is seen in FIG. 1, feedwater enters reactor 10 through a line 11, joins recirculating water and passes through core 12 made up of a plurality of nuclear fuel elements which produce heat by nuclear fission, is there vaporized at least in part, is dried in steam separator and dryer 13 and leaves the reactor through line 14. During fission of the fuel elements, several radioactive gaseous fission products are formed in the fuel. Small amounts of these gases may leak through defects in fuel cladding and become mixed in the cooling water. Typical gases thus formed include xenon and krypton. Also, a small amount of the cooling water in core 12 is radiolytically decomposed to hydrogen and oxygen.

A recirculation system including pumps 16 and 17 continuously recirculate the unvaporized portion of the cooling water to achieve the required heat transfer. A portion of the recirculated water is passed through line 18 to cleanup demineralizer system 19 and back through line 20 to feedwater line 11. This helps eliminate undesired corrosion products from the core.

The steam enters turbine 21 which is connected in driving relationship to electric generator 22. While FIG. 1 shows a turbine as the load for exemplary purposes, the load may be any unit producing useful work from the steam energy. For example the steam could be used to heat a building, to evaporate saline water in a thermal de-salting plant, etc. Turbine 21 includes both high and low pressure sections. The steam entering turbine 21 is generally at a temperature of about 545° F. and a pressure of about 1000 p.s.i. A portion of the steam in the high pressure section of turbine 21 is extracted and passes through line 23 to high pressure feed water heater 24. The steam passing through the turbine is condensed to water in the main condenser 29. Non-condensible gases from the main condenser pass to a holding tank (not shown) where short-lived fission products are allowed to decay, then the gases are vented to the atmosphere. The gases consist primarily of oxygen and hydrogen formed radiolytically in reactor core 12. In addition, there are small amounts of nitrogen, xenon, krypton, etc. The power cycle uses a conventional regenerative feedwater system. The feedwater temperature and the number of feedwater heaters are selected in accordance with normal power plant considerations of power cycle performance and economics. The shell side of feedwater heaters 24 and 26 are vented through lines 27 and 28 to condenser 29. Condensate from feedwater heaters 24 and 26 is returned to main condenser 29 through line 35. Main condenser 29 provides feed system de-aeration. Steam from the low pressure section of turbine 21 is passed through line 25 to the low pressure feedwater heater 26. Condensate from condenser 29 is pumped by pump 30 to a full-flow demineralizer 31. Water from demineralizer 31 passes to low pressure feedwater heater 26 through line 32. Heated feedwater passes through feedwater heaters 24 and 26 and is pumped by pump 33 back to the reactor, thus completing the cycle.

In practice, the water as it enters the feedwater preheater has been extensively demineralized, corrosion products have been removed therefrom and the oxygen content has been lowered to less than about 20 p.p.b. However, it has been found that in spite of this, substantial corrosion occurs in the stainless steel preheaters and in carbon steel connecting piping. Thus, the water as it enters the reactor through line 11 contains appreciable amounts of corrosion products which tend to deposit on the fuel assemblies in core 12 impairing their heat transfer capabilities. It has now been found in accordance with this invention that the addition of oxygen with a stoichiometric amount of hydrogen immediately upstream of the feedwater preheaters 24 and 26, such as at oxygen/hydrogen introduction station 34 will dramatically decrease corrosion in the feedwater piping and process equipment, and the introduction of corrosion products into the system. As is pointed out above, oxygen and hydrogen should be added at station 34 until the feedwater contains from about 50 to 30,000 p.p.b.; or preferably, from about 100 to about 300 p.p.b. oxygen in the water stream, accompanied by stoichiometric amounts of hydrogen.

Oxygen and the stoichiometric quantity of hydrogen may be added to the feedwater stream in any suitable manner. One simple method is to admit oxygen and hydrogen gas into the water stream at station 34 from pressurized containers. This is an advantageous method in a small hot-water system or in a fossil-fuel boiler system. However, in a water cooled or moderated nuclear reactor a more convenient and economical source of a stoichiometric mixture of hydrogen and oxygen is available. As noted above, oxygen and hydrogen gas are produced in a boiling water reactor core by radiolytic decomposition of water in relatively large quantities; on the order of 30,000 p.p.b. oxygen. Thus, an oxygen content in the range of 50 to 30,000 p.p.b. in the feedwater can be obtained simply by recycling all the oxygen and hydrogen with the condensed steam through the feedwater heaters and back to the reactor. It has been found that the addition of hydrogen and oxygen to the feedwater does not result in a proportional increase in hydrogen and oxygen in steam produced by the reactor.

Another source of hydrogen and oxygen gas for introduction into the feedwater would be to introduce a portion of the high pressure steam generated by the reactor directly from line 14 into the feedwater at station 34. This would be a high pressure source of the gases and would eliminate the necessity of an injection pumping system to introduce the gases into the feedwater stream. However, due to the low gas concentration (30,000 p.p.b. oxygen) a large injection quantity is required to bring the entire feedwater stream up to the preferred range of about 100 to about 300 p.p.b. oxygen. For example, where the feedwater flow is about 14 million pounds per hour, about 100,000 to 150,000 pounds per hour of high pressure steam would be required to obtain the desired portion of oxygen in the feedwater. The steam thus used could be obtained either directly or from line 14 before the steam reaches turbine 21 or from extraction steam line 23 or 25.

While, each of the above methods for introducing the desired oxygen and hydrogen, into the feedwater stream is advantageous in certain situations, excellent results in general are obtained by utilizing hydrogen and oxygen gas from the vents of the highest pressure heater in the feedwater system. FIG. 2 shows a schematic flow sheet for this preferred embodiment of a system for introducing the desired amounts of oxygen and hydrogen into the feedwater stream.

FIG. 2 includes that portion of FIG. 1 including feedwater heaters 24 and 26, extraction steam lines 23 and 25 and return lines 27 and 28. Incorporated with this structure is the system for obtaining the desired quantity of gas containing a stoichiometric ratio of oxygen and hydrogen and for introducing this gas into the feedwater line and for controlling the quantity introduced. Noncondensible gases and some extraction steam, after passing through the series of feedwater heaters, are returned to the main condenser 29 (FIG. 1) through check valve 36. A portion of this flow is taken off by line 37 through control valves 38 and 39 to holding tank 40. Between valves 38 and 39 the flow passes through the heat exchanger 41 which condenses remaining steam and passes the condensate through valve 42 back to main condenser 29. Holding tank 40 holds a sufficient quantity of the oxygen-hydrogen mixture to maintain a steady feed. Holding tank 40 may, when desired, be drained of any condensate through valve 41 to the main condenser 29. As needed, the oxygen-hydrogen mixture passes from holding tank 40 through line 44 and control valve 45 to pump 46. Explosion proof pump 46 delivers the oxygen-hydrogen mixture to receiving tank 47 as required by controller 48. From receiving tank 47 the mixture is metered into the feedwater line 32 through control valves 49 and check valves 50 and 51. Downstream from the introduction point a portion of the feedwater is fed through valve 52, cooled by heat exchanger 53 and passed to an oxygen analyzer 54. Oxygen analyzer 54 continuously determines the oxygen content of the feedwater stream and regulates metering valve 49 to keep the oxygen quantity within desired limits. It is preferred that the injection point be as close to main condenser 29 as possible. However, under some circumstances it is desirable to have the injection point downstream of demineralizer 31 since the oxygen may have a detrimental effect on some demineralizer resins. If desired, the injection point could be between the several feedwater heaters, or even downstream of the heaters.

Detailed description of preferred embodiments

The following examples further specifically define the present invention with respect to the introduction of oxygen, preferably with hydrogen, into boiler feedwater. Parts and percentages are by weight unless otherwise indicated. The examples below are intended to illustrate various preferred embodiments of the present invention.

EXAMPLE I

An injection system such as is shown schematically in FIG. 2 is incorporated into a conventional boiling water reactor nuclear power plant such as is shown in FIG. 1. Extraction steam (total flow is about 875,000 lb./hr.) at a temperature of about 340° F., and pressure of about 100 p.s.i.g. passes from the turbine to the feedwater heaters. Vent gas from the high pressure heater (about 500 lb./hr.) at about the same temperature and pressure containing primarily a stoichiometric ratio of oxygen and hydrogen, with a small amount of steam, is ordinarily returned to the main condenser. In the process of this example, however, a portion, generally about 15%, of the vent gas is passed to a holding tank for injection into the reactor feedwater. From the holding tank, the gas is pumped by a diaphragm pump to a pressure of greater than about 150 p.s.i.g., which is necessary for injection since the feedwater is at a pressure of about 150 p.s.i.g. The oxygenated steam is then metered to the feedwater line upstream of the heaters under control of an oxygen meter located further downstream. Since total feedwater flow is about 14,000 lb./hr., about 75 lb./hr. of the gas is pumped into the feedwater line. When this injection system is put into operation, it is observed that corrosion in stainless steel and carbon steel piping and equipment between the injection station and the reactor decreases. Total corrosion products released into the system decrease to less than 10% of the rate observed with low-oxygen (<20 p.p.b.) feedwater.

EXAMPLE II

The improved corrosion characteristics of a system using the process of this invention can be shown by direct comparison tests. The test device consists of a continuous channel through which water flows past six stations. At each station a coupon of the material tested is supported in contact with the flowing water. Means are provided to raise the water temperature between stations. Water temperature at each station is: (1) 150° F., (2) 200° F., (3) 250° F., (4) 300° F., (5) 350° F., and (6) 400° F. After the last test station, the water is cooled, given full flow demineralization and recycled. Provision is included for varying the oxygen and hydrogen content of the water and for varying water velocity past the test coupons. The test coupons are about 3 inches by ¾ inch, by ⅛ inch and are prepared where possible from commercial tubing. The tubing is cut, flattened, cleaned, weighed and placed in the holders. Coupons cut from sheet stock may be similarly prepared and tested.

Water containing the desired amount of oxygen is passed through the test device at a velocity of about 6 f.p.s. for about 5000 hours with each tested material. Weight loss or gain is then measured. The samples are then descaled and weighed to give the total amount of metal involved in corrosion. From this the rate of loss of weight to the system can be calcuated.

Table I below gives the results for a comparison using carbon steel samples with (a) less than 10 p.p.b. oxygen and (b) about 200 p.p.b. oxygen in the water. In the latter case, hydrogen was included in a stoichiometric quantity, based on the oxygen. The carbon steel tested had the following composition, by weight percent: 99.257% Fe, 0.12% C, 0.5% Mn, 0.013% P, 0.03% S and 0.08% Si.

Corrosion and metal loss rates are measured in milligrams per square decimeter-month.

TABLE I

| Temp. (° F.) | <10 p.p.b. O₂ | | 200 p.p.b. O₂, 25 p.p.b. H₂ | |
|---|---|---|---|---|
| | Corrosion rate | Loss-of-metal rate | Corrosion rate | Loss-of-metal rate |
| 150 | 188 | 184 | 2.1 | 1.0 |
| 200 | 284 | 278 | 6.3 | 3.2 |
| 250 | 284 | 278 | 8.5 | 4.9 |
| 300 | 208 | 191 | 21.0 | 11.1 |
| 350 | 207 | 199 | 11.8 | 6.1 |
| 400 | 164 | 149 | 4.7 | 1.6 |

As loss can be seen from the above table, the corrosion rate and the rate of loss of metal to the system are dramatically reduced by the addition to the feedwater of a stoichiometric ratio of hydrogen and oxygen.

EXAMPLE III

Corrosion rates often vary with varying water velocity. Therefore, tests are conducted using a device such as is described in Example II at different water velocities, at different temperatures and with different quantities of entrained oxygen. In each test which uses 200 p.p.b. oxygen, a stoichiometric quantity of hydrogen is included, based on the quantity of oxygen present.

Table II gaves results before descaling for tests using carbon steel having the following composition, by weight percent: 99.257% Fe, 0.12% C, 0.5% Mn, 0.013% P, 0.03% S and 0.08% Si.

TABLE II

| | Velocity, f.p.s. | Weight changes, mg./dm.² ᵃ | | | | | |
|---|---|---|---|---|---|---|---|
| | | 500 hrs. | | 1,000 hrs. | | 1,500 hrs. | |
| | | <10 ᵇ | 200 ᵇ | <10 ᵇ | 200 ᵇ | <10 ᵇ | 200 ᵇ |
| 100° F | 6 | −330 | +5.1 | −494 | +1.2 | −658 | +43.4 |
| | 12 | −432 | +6.4 | −650 | +2.7 | −853 | −51.0 |
| | 24 | −536 | −8.2 | −772 | −41.5 | −1,111 | −4.7 |
| 400° F | 6 | −442 | −33.9 | −561 | −33.3 | −704 | −31.2 |
| | 12 | −567 | −35.0 | −752 | −38.6 | −1,005 | −33.4 |
| | 24 | −535 | −41.6 | −657 | −40.2 | −829 | −39.1 |

ᵃ += Gain; −= Loss.
ᵇ O₂, p.p.b.

As can be seen from the data given in Table II, the decrease in weight loss using about 200 p.p.b. oxygen is striking. The beneficial effects show up both as a better than order of magnitude decrease in weight loss and by the lack of increase in weight loss from one time period to the next.

EXAMPLE IV

Commercial power plants, must be shut down from time to time for maintenance, repair, refueling, etc. During these periods, piping and associated equipment is often in contact with stagnant, air-saturated water for long periods. This condition also exists for a period during start-up of a new or modified plant. Generally, corrosion rates are high for metals in contact with the stagnant, air-saturated water.

Tests are performed to determine whether the adverse effects of these shutdown periods can be modified by including high oxygen levels in the water before and/or after such a shutdown period. These tests are performed in a test device as is described in Example II above. Three series of tests are performed, (a) a continuous 1000 hour run at each oxygen level, (b) 500 hours static in contact with air-saturated water, then 500 hours at an about 200 p.p.b. oxygen level, and (c) 500 hours at oxygen level of about 200 p.p.b., then 500 hours static in contact with air-saturated water. After each test, the loss of weight to the system is measured. The samples here are carbon steel having the following composition, by weight percent: 99.257% Fe, 0.12% C, 0.5% Mn, 0.013% P, 0.03% S and 0.08% Si and the moving water contains a stoichiometric quantity of hydrogen.

TABLE III

| | Scaled weight losses, mg./dm.¹ | | | |
|---|---|---|---|---|
| | Continuous exposure, 1,000 hours | | Intermittent exposure | |
| | | | 500 hours static plus 500 hours, 200 p.p.b. O₂ | 500 hours, 200 p.p.b. O₂, plus 500 hours static |
| Exposure temp., ° F. | 200 p.p.b. O₂ | <10 p.p.b. O₂ | | |
| 100 | 19 | 435 | 203 | 69 |
| 150 | 26 | 559 | 181 | 57 |
| 200 | 38 | 805 | 177 | 58 |
| 250 | 53 | 769 | 317 | 98 |

As can be seen from Table III, 1000 hours of continuous exposure to water containing about 200 p.p.b. oxygen produces more than an order of magnitude less corrosion than does the low-oxygen water. In both of the intermittent tests, the corrosion is substantially less than in the continuous test at 10 p.p.b. oxygen. Thus, some lasting protection appears to result from operation in water containing about 200 p.p.b. oxygen, especially where such treatment precedes exposure to air-saturated, static water.

EXAMPLE V

Further tests are performed as in Example II using a Type-304 stainless steel available commercially, having the following composition, by weight percent: 80.196% Fe, 0.07% C, 1.15% Mn, 0.022% P, 0.012% S, 0.60% Si, 18.43% Cr, and 9.52% Ni. Total test time here is 2500 hours. The results are tabulated in Table IV below. Corrosion and loss-of-metal rates are measured in milligrams per square decimeter-month.

TABLE IV

| Temp. (° F.) | <10 p.p.b. O₂ | | 220 p.p.b. O₂; 25 p.p.b. H₂ | |
|---|---|---|---|---|
| | Corrosion rate | Loss-of-metal rate | Corrosion rate | Loss-of-metal rate |
| 150 | 1.2 | 1.0 | <0.1 | <0.1 |
| 200 | 1.7 | 0.8 | 0.7 | <0.1 |
| 250 | 2.7 | 1.2 | 1.2 | <0.1 |
| 300 | 3.4 | 2.4 | 1.2 | 0.2 |
| 350 | 5.8 | 4.1 | 3.7 | <0.1 |
| 400 | 12.5 | 8.8 | 1.0 | <0.1 |

While the results are less dramatic than with carbon steel (largely because stainless steel is more resistant to corrosion, even in the low-oxygen water) the benefit of using about 200 p.p.b. oxygen in the feedwater is appreciable with stainless steel. The improvement in losses to the system are especially apparent.

Although specific components and proportions have been described in the above examples, other suitable materials as indicated above, may be used with similar results. In addition other materials may be added to the system, reactor feedwater, etc. to enhance or otherwise modify their properties. The system carrying heated water in piping and process equipment may be a steam boiler of any suitable type, or may be any other heat exchange system using heated water. The load which converts the steam or heated water to useful work may be a turbine, a heat exchanger or any other suitable mechanism.

Other modifications and ramifications of the present invention will occur to those skilled in the art upon reading the present disclosure. These are intended to be included within the scope of this invention.

What is claimed is:

1. In a process for operating a nuclear boiler in which steam generated in a nuclear reactor passes to a load and then is condensed and degassed in a condenser and the resulting condensate is pre-heated in a feedwater heater by steam extracted from said load and returned to said reactor for recycling; the improvement comprising inhibiting corrosion in the feedwater piping and associated process equipment by metering a portion of the gases vented from the shell side of a feedwater heater into the feedwater said gases comprising a stoichiometric mixture of oxygen and hydrogen, monitoring the oxygen content of the feedwater downstream of the gas addition point and regulating the quantity of gases metered into said feedwater to maintain an oxygen level in said feedwater of from about 50 to about 30,000 parts per billion oxygen, by weight.

2. The method of claim 1 wherein said oxygen level is maintained at about 50 parts per billion by weight.

3. In a nuclear power plant of the boiling water type including a nuclear boiler to produce steam, a load receiving said steam, a condenser receiving spent steam from the load, means to degas and demineralize condensate, and feedwater heater means to prepare the condensate for recycling to the reactor; the improvement comprising means to inhibit corrosion in feedwater piping and related process equipment including means passing to a holding tank a portion of the gases comprising a stoichiometric mixture of oxygen and hydrogen vented from a feedwater heater, pump means to raise the pressure of said gases above feedwater line pressure, feed means to introduce said gases into said feedwater piping upstream of said feedwater heaters, oxygen analyzer means to monitor the oxygen content of feedwater downstream of said introduction point and control means adapted to vary the quantity of said gases introduced into said feedwater in response to the oxygen content of said feedwater as indicated by said oxygen analyzer to maintain the oxygen content of said feedwater at from about 50 to about 30,000 parts per billion oxygen, by weight, together with the stoichiometric quantity of hydrogen, based on said oxygen.

4. The improvement according to claim 3 further including means to condense and remove steam mixed with said gases, and pass the remaining gases to the holding tank in which a quantity of said gases accumulates, said pump arranged to receive gases from said holding tank and deliver them to a receiving tank at a pressure higher than feedwater line pressure, said feed means arranged to receive gases from said receiving tank and to meter said gases into said feedwater immediately downstream of said demineralizer means.

References Cited
UNITED STATES PATENTS

| | | | |
|---|---|---|---|
| 2,904,488 | 9/1959 | Thamer et al. | 176—54 |
| 2,920,025 | 1/1960 | Anderson | 176—92 X |

OTHER REFERENCES

Ind. Eng. Chem., vol. 51, No. 10, October 1959, pp. 1262–1264, by Brutschy et al.

Corrosion, vol. 17, 1961, pp. 269t–276t, by Vreeland et al.

ANL–6562, 1963, pp. 12, 15, 16, 26, 27, 29, 35, 36, 45, 57, 59, 69, 87, 94.

CARL D. QUARFORTH, Primary Examiner

H. E. BEHREND, Assistant Examiner

U.S. Cl. X.R.

176—55, 92